March 10, 1970     R. C. FERGASON     3,499,274
COTTON HARVESTER

Filed Aug. 25, 1967     4 Sheets-Sheet 1

United States Patent Office 3,499,274
Patented Mar. 10, 1970

3,499,274
COTTON HARVESTER
Rector C. Fergason, 218 Argyle Circle,
Gadsden, Ala. 35901
Filed Aug. 25, 1967, Ser. No. 663,356
Int. Cl. A01d 45/18
U.S. Cl. 56—44                                     5 Claims

ABSTRACT OF THE DISCLOSURE

A cotton harvester having stripper bars connected by flexible plastic members to prevent foreign material from passing between stripper bars and winding about picking spindles rearwardly of the strippers so that such material will not be stripped.

---

The present invention relates to drum type cotton pickers and more particularly to improved shielding means between the stripper bars.

This invention is primarily concerned with the type of cotton picker employing rotating spindles projecting radially from revolving drums and having a series of vertically extending stripper bars about the drum and which bars are shiftable inwardly along the spindles to periodically clear the spindles of collected cotton.

The use of movable or flexible aprons between the stripper bars to prevent the passage of cotton, dirt and plant debris between adjacent stripper bars and thus avoid the packing and wrapping of this material on the spindles between the drum and stripper bars is shown in the prior art. These prior art devices have provided hinged plates or the combination of hinged plates and flexible material to achieve a barrier or shield between stripper bars. These prior art devices folded and extended outwardly between the spindles and away from the drum when they were in the picking zone with the stripper bars close together. By having the aprons folded outwardly, the picking effectiveness of the spindles was reduced and such aprons were also subject to damage and wear from the passage of cotton plants. The prior art structures were also costly to manufacture and required separate fastening means to secure the apron to the stripper bars.

In the present shield structure, we have overcome the above objections by providing a one piece low cost shield of relatively thin plastic material that folds inwardly between the stripper bars and is secured to the stripper bar by its cover plate and which plate and stripper bar have formed edges to prevent the plastic shield material from inadvertently folding outwardly.

It is an object of this invention to provide a plastic shield between stripper bars which folds inwardly between the stripper bars when the spindles are in picking position.

It is a further object of this invention to provide stripper bars with angled edges where the plastic shields are attached so that the shields are directed to fold inwardly.

It is a further object of this invention to provide fastening means for shields between stripper bars wherein said fastening means is the identical fastening means for retaining stripper bushings in said stripper bar.

It is a further object of this invention to provide cover plates which have the edges thereof bent complementary to the edges of the stripper bar to provide direction to shields fastened between the cover and stripper bar so that the shield will bend in the desired direction.

Other objects and advantages of the structure of the present invention will become more apparent on reference to the accompanying drawings and the following description in the specification.

Figure 1:
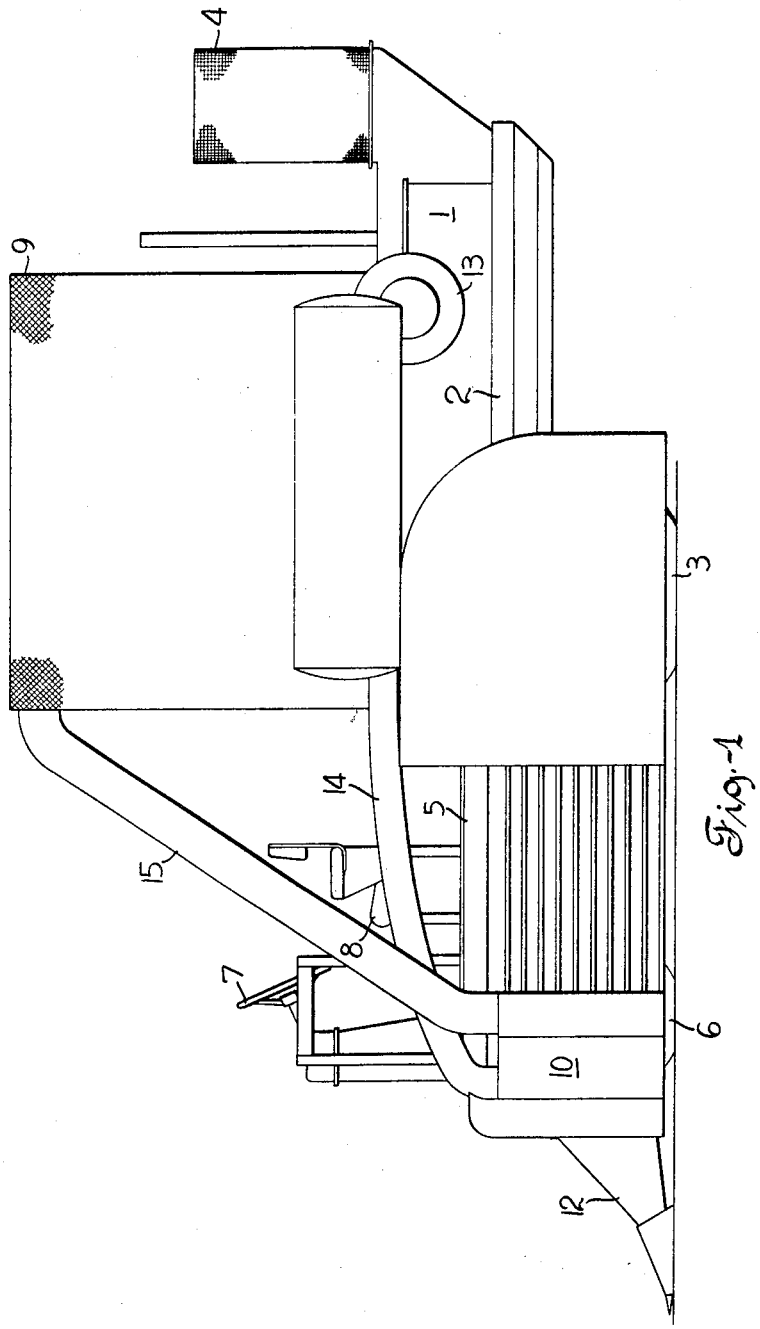
FIG. 1 is a side elevation of a cotton harvester embodying the subject invention.

Referring more particularly to the drawings, and to FIG. 1 specifically, a cotton harvester embodying the invention consists generally of an engine 1 joined to an axle housing (not shown) and supported thereby as a cantilever beam. A frame member 2 supports engine 1 from the axle housing. A pair of laterally spaced traction wheels 3 (only one is shown) are operatively connected to opposite sides of the axle housing in a conventional manner. Engine 1 is provided with an air intake cleaning screen 4 which is carried by the engine. A forwardly extending frame 5 is attached at its rear end on the axle housing. The forward end of frame 5 is supported on a dirigible wheel 6 which is operatively connected to steering wheel 7 carried by the front end of frame 5. An operator's seat 8 is carried by frame 5 rearwardly of the steering wheel 7. A picked cotton receiving basket 9 is carried on frame members 2 and 5 rearwardly of operator's seat 8. Cotton picker assemblies 10 are mounted on each side of the forward end of frame 5. These assemblies are carried by a subframe 11 (see FIG. 2) which is adjustably connected to frame 5 for vertical movement relative thereto. The forward end of assemblies 10 (see FIG. 1) are provided with plant dividers 12 which guide cotton plants into contact with cotton pickers which are positioned just rearwardly of the plant dividers. If further details of the stalk dividers are desired, reference may be had to U.S. patent application Ser. No. 456,399, now Patent No. 3,380,233, filed May 17, 1965 for Plant Divider for Harvester. Frame 2 supports a blower 13 which is provided with a duct 14 which delivers pressurized air to picking assembly 10 and to a cotton delivering duct 15 for depositing picked cotton into basket 9.

Figure 2:
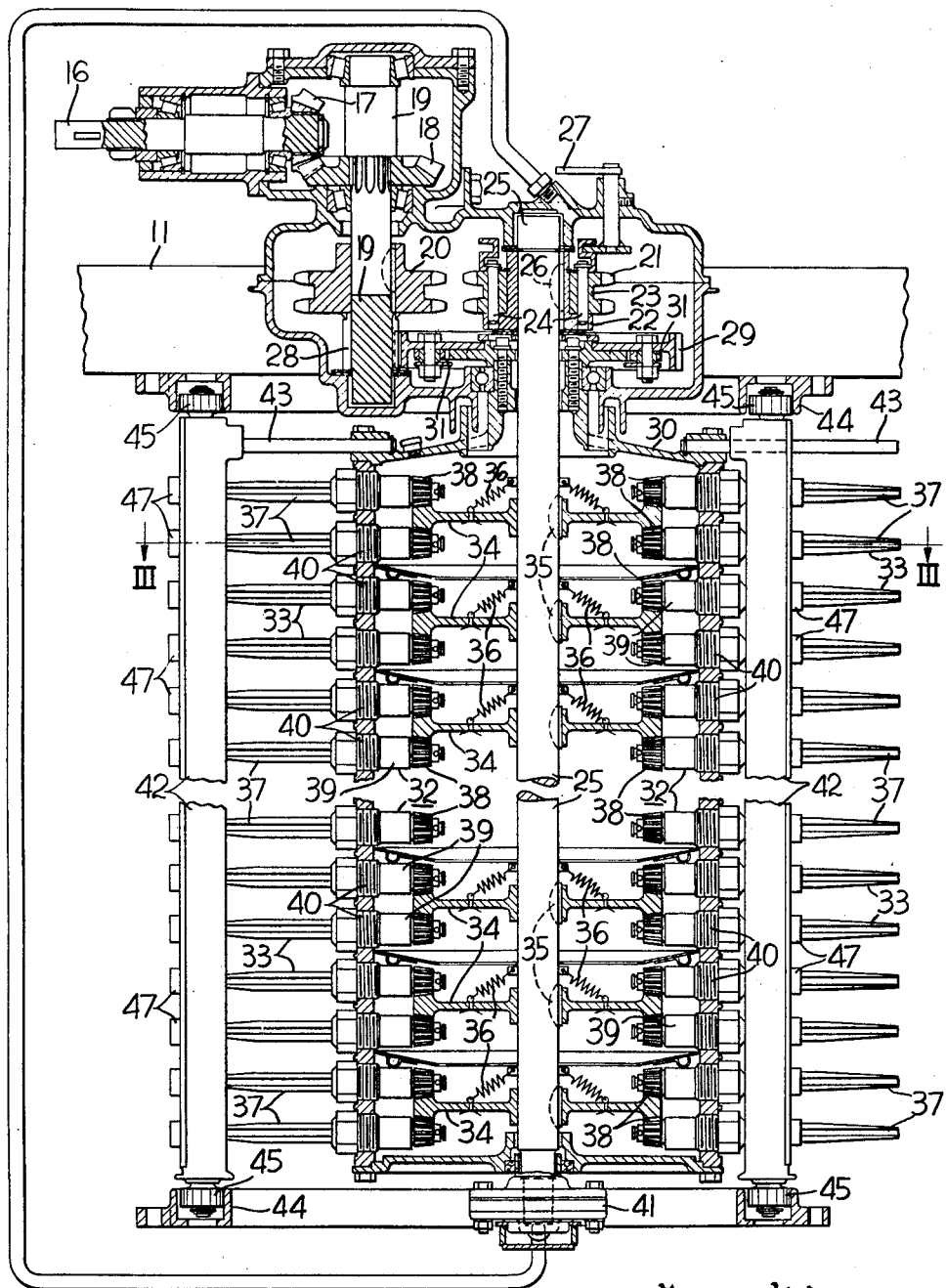
FIG. 2 is a cross sectional view of a drum type cotton harvester embodying the invention showing the power train for driving the drum and picking spindles and showing a vertical row of cotton picking spindles on the right in picking position and on the left in stripped position.

Engine 1 is provided with a power takeoff shaft (not shown) which is operatively connected to shaft 16 of picking unit 10 (see FIG. 2). A gear 17 is attached to shaft 16 for rotation therewith and gear 17 is drivingly engaged with gear 18 attached to shaft 19. A double sprocket 20 attached to shaft 19 is drivingly connected to double sprocket 21 by means of chains (not shown). Double sprocket 21 includes a center portion 22 upon which an outer portion 23 is journaled. These two portions 22 and 23 are selectively joined together by means of pins 24. Center portion 22 is keyed to shaft 25 for rotation therewith by conventional means such as half-moon key 26. Pins 24 can be raised vertically by raising handle 27 and the mechanism connected therewith to interrupt the driving connection between portions 22 and 23.

Beneath sprocket 20 a gear 28 is formed in shaft 19. Gear 28 is drivingly engaged with a gear 29 which is positioned about shaft 25 and which rotates relative thereto. Gear 29 is attached to drum 30 for rotation therewith. A ratchet mechanism 31 is interposed between drum 30 and gear 29 so that drum 30 can only be driven in one direction. If driven in the opposite direction, the ratchet mechanism interrupts the drive.

Reference number 30 designates the drum or cylinder of a cotton picking machine and which drum carries a plurality of cotton picking assemblies 32. Each picking assembly 32 includes a picking spindle 33. Pairs of horizontal rows of spindles 33 are driven by a double bevel gear 34 secured to drive shaft 25 by means of key 35. Springs 36 suspend gears 34 from shaft 25 and half-moon keys 35 permit gears 34 to be self-aligning. By not having the weight of the gears supported on the lower of the pair of spindles, backlash problems in the gears are eliminated.

The spindle assembly 32 includes a picking spindle 33 having an inner shank portion and a picker portion 37. A beveled pinion gear 38 is attached to the inner end of spindle 33 and drives same by means of bevel gear 34. Tubular support 39 is positioned about the after portion of spindle 33. The outer surface of tubular support 39 is threaded as at 40 so that spindle assemblies 32 can be securely received by corresponding threaded openings in the drum 30.

Oil for lubrication of gears and bearings is furnished by pump 41 which pumps oil to the upper portion of the picker unit and thereafter permitting same to return to the pump by action of gravity while performing its lubricating function. The impeller of pump 41 is operatively connected to the lower end of shaft 25 for rotation therewith. It is to be noted that this oil lubrication system for drum 30 mechanisms retains the oil within the drum and the lubrication for the stripper bars 42 is entirely independent and separate from this oil lubrication system.

A stripper bar 42 is associated with each vertical row of spindles on the drum 30 and stripper bars 42 are supported from the drum by means of radial extending rods 43 upon which bars 42 are slidably mounted. A pair of vertically spaced stationary cam tracks 44 carried by means of frame 11 at the upper end and by means (not shown) at the lower end are arranged to receive cam follower rollers 45 carried by the ends of stripper bars 42 and to cause movement of the stripper bars longitudinally of the spindles during rotation of the drum. As shown in FIG. 2, the stripper bar on the right hand side is shown in retracted or spindle picking position and the stripper bar on the left is shown in extended or stripped spindle position.

Figure 3:
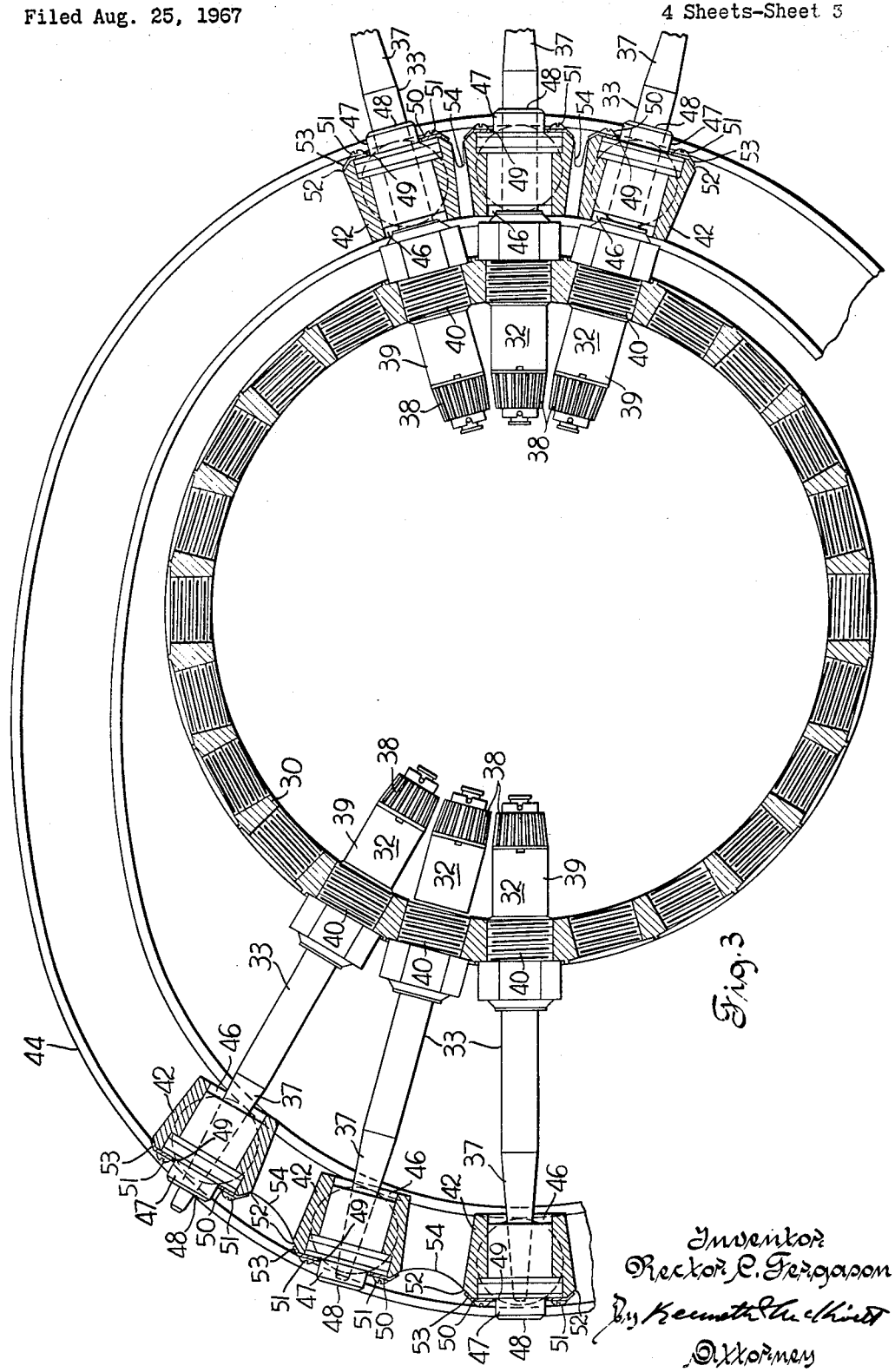
FIG. 3 is a cross sectional view taken on line III—III of FIG. 2 with parts omitted for the sake of clarity of illustration; and, FIG. 4 is an exploded isometric view of the upper portion of a stripper bar, cover plates and the plastic shielding mounted thereon, with some parts being omitted for the sake of clarity.
Figure 4:
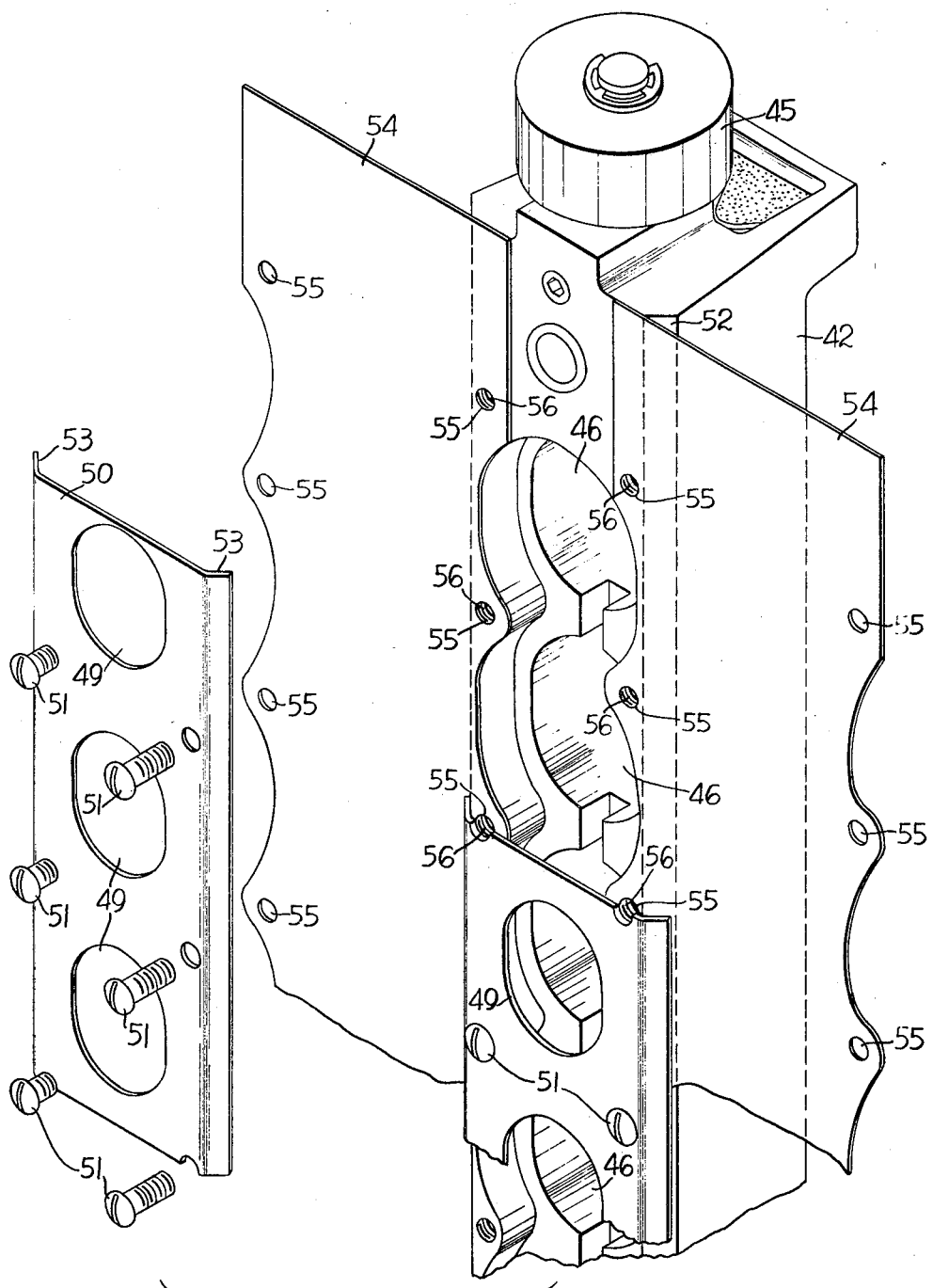

Each of the spindles 33 projects through an opening 46 in the stripper bar and in each opening a stripper bushing 47 is located. The stripper bar bushings are reciprocated on the spindles by action of the stripper bars. The forward end 48 (see FIG. 3) of stripper bushing 47 extends through an opening 49 in cover plate 50 which retains stripper bushings 47 in stripper bar 42. Cap screws 51 retain cover plate 50 in contact with stripper bar 42. It should be noted that the outer edges of stripper bars 42 are cut off on an angle as at 52 and cover plate 50 has its side edges bent as at 53 to conform with this angle 52.

A plastic shield 54 extends transversely from one adjacent stripper to the next. These shields 54 are provided with a series of openings 55 therein aligning with the openings 56 in stripper bars 42 and these openings 56 are threaded to engage with cap screws 51. These plastic shields are retained in place between stripper bar 42 and cover plate 50 by the same means that keeps cover plates 50 on stripper bars 42—namely cap screws 51 pressing down on cover plate 50 frictionally engages shield 54 against stripper bar 42. Shields 54 extend from cover plates 50 and stripper bars 42 at a rearwardly extending angle as determined by surface 52. This angle assures that when the stripper bars have moved into the cotton picking position shown to the right in FIG. 3, that the shield will be folded rearwardly and will not be extending into the picking zone.

The use of plastic in the construction of these shields provides several advantages. Plastic is obtainable which is tough and flexible enough so that it can be very thin and fit between adjacent stripper bars and yet be strong enough to do the job. Furthermore, being plastic it will stand up under conditions which will make other fibers fail such as being periodically moistened with water.

From the foregoing, it is seen that folding shields have been provided between all the stripper bars and accordingly these shields prevent cotton, leaves, trash and dirt from getting behind the stripper bar to be wrapped around the spindle in a position where the stripper bushing will not function to strip this material from the spindle.

The embodiments of the invention in which an exclusive property or privilege is claimed are defined as follows.

1. In a cotton harvester including a picking cylinder having peripherally outstanding picking spindles and stripper bushings rotatable with said spindles and said cylinder and operable lengthwise of the spindles for shifting picked cotton outward along the spindles, said bushings being positioned in vertically extending stripper bars, and means affording a complete covering for the spaces between said stripper bars for prevention of materials entering between said bars, said means including an apron extending between outer edges of adjacent bars and adapted to fold inwardly toward said cylinder, and each stripper bar being provided with a cover member for retaining said bushings in said bar and is configured complementary to said bar, said stripper bar having its outer edges formed so that said apron mounted thereon is directed thereby to fold inwardly toward said cylinder when the adjacent spindles are in picking position.

2. In a cotton harvester as recited in claim 1 and means for retaining said cover member in contact with stripper bar and said apron is positioned between said cover member and said bar.

3. In a cotton harvester as recited in claim 2 and wherein the apron contacting portion of said bar and said cover member are angled to position said apron to extend in a direction to fold same inwardly toward said cylinder when said bars are retracted to a picking position.

4. In a cotton harvester as recited in claim 3 and wherein said apron is constructed of a relatively thin plastic film.

5. In a cotton harvester as recited in claim 4 and wherein said bars are provided with radially extending sides to provide uniform spacing between adjacent bar sides for receiving said folded apron during the picking cycle of said bars.

References Cited
UNITED STATES PATENTS

| | | | |
|---|---|---|---|
| 1,747,567 | 2/1930 | Berry | 56—44 |
| 1,750,952 | 3/1930 | Berry | 56—44 |
| 1,786,851 | 12/1930 | Johnston et al. | 56—47 |
| 2,302,180 | 11/1942 | Brown et al. | 56—44 |

RUSSELL R. KINSEY, Primary Examiner